(12) United States Patent
Chen

(10) Patent No.: US 7,516,969 B2
(45) Date of Patent: Apr. 14, 2009

(54) TRAVEL ADJUSTABLE FRONT SUSPENSION FORK

(76) Inventor: Hui-Hsiung Chen, No.34, Chia-Hou Rd, Waipu, Taichung Hsien (TW)

( * ) Notice: Subject to any disclaimer, the term of this patent is extended or adjusted under 35 U.S.C. 154(b) by 470 days.

(21) Appl. No.: 11/257,026

(22) Filed: Oct. 25, 2005

(65) Prior Publication Data
US 2007/0090624 A1    Apr. 26, 2007

(51) Int. Cl.
  *B62K 25/08* (2006.01)
(52) U.S. Cl. .......................... 280/276; 188/297
(58) Field of Classification Search .......... 280/276, 280/277, 275, 279, 284, 283; 188/285, 297, 188/319.1, 319.2, 316, 317; 180/276, 275, 180/277, 279, 283, 284
See application file for complete search history.

(56) References Cited

U.S. PATENT DOCUMENTS

| | | | | |
|---|---|---|---|---|
| 6,095,541 A | * | 8/2000 | Turner et al. ............. | 280/276 |
| 6,217,049 B1 | * | 4/2001 | Becker ..................... | 280/276 |
| 6,343,807 B1 | * | 2/2002 | Rathbun .................. | 280/276 |
| 6,631,915 B2 | * | 10/2003 | Barefoot .................. | 280/276 |
| 7,195,234 B2 | * | 3/2007 | Jordan et al. ............ | 267/64.11 |
| 7,296,812 B2 | * | 11/2007 | Fujita et al. ............. | 280/276 |
| 7,325,661 B2 | * | 2/2008 | Chen ........................ | 188/300 |

* cited by examiner

*Primary Examiner*—Anne Marie Boehler
(74) *Attorney, Agent, or Firm*—Rosenberg, Klein & Lee

(57) ABSTRACT

A front suspension fork includes an adjustable device connected to at least one inner tube of the legs of the front fork and the adjustable device includes a rotatable cap which is fixed to a threaded rod which is moved up and down by rotating the cap. A pneumatic cylinder is connected to the lower end of the threaded rod and a connection part is connected to the lower end of the pneumatic cylinder and the connection part can be moved in the inner tube. The travel of the inner tube can be adjusted by adjusting the position of the threaded rod relative to the pneumatic cylinder.

9 Claims, 7 Drawing Sheets

TRAVEL ADJUSTABLE FRONT SUSPENSION FORK

FIELD OF THE INVENTION

The present invention relates to a light bicycle front suspension fork wherein the travel of the inner tube can be adjusted.

BACKGROUND OF THE INVENTION

A conventional bicycle front suspension fork is shown in FIG. 4 and generally includes a crown 50 with two legs 51 connected thereto and each leg 51 includes an outer tube 53 and an inner tube 52 which is inserted in the outer tube 53 with a bush 54 located between the inner and outer tubes 52, 53. An adjustable device 60 is connected on a top of the inner tube 52 and includes a rotatable cap 61 and a connection member 62 connected to the top of the inner tube 52, and a rotatable member 63 which is connected to a top of a first spring 64. A rod 55 is connected to a lower end of the outer tube 53 and inserted into the inner tube 52 so as to be contact against a lower end of the first spring 64. A second spring 66 is mounted to the rod 55 and received in the lower end of the inner tube 52. A separator 65 is connected on the rod 55 so as to separate the first and second springs 64, 66.

The front suspension fork can be adjusted by rotating the cap 61 to adjust the first spring 64. The rod 55 is then moved upward or downward relative to the inner tube 52 so as to adjust the travel of the inner tube 52 relative to the outer tube 53.

However, the first and second springs are heavy and the springs are preloaded when installing into the legs of the front suspension fork, so that the springs reach their fatigue limit after a period of time of use. It is also difficult to replace a correct spring by the users.

The present invention intends to provide a travel adjustable front suspension fork which is easily to be operated.

SUMMARY OF THE INVENTION

The present invention relates to a front suspension fork which comprises a crown with two legs connected thereto and each leg having an outer tube and an inner tube which is movably inserted into the outer tube. A top of the inner tube is connected to the crown. An adjustable device is connected to at least one of the two inner tubes and includes a rotatable cap, a connection member connected to the inner tube and a rotatable member. A movable member is connected to a lower end of the rotatable member and is co-rotated with the rotatable member. A pneumatic cylinder is connected to the movable member by a connection tube, and the pneumatic cylinder can be moved up and down by rotation of the movable member. A connection part is pivotably connected to a lower end of the pneumatic cylinder and an outer periphery of the connection part is movably connected to the inner tube. A rod is connected to a lower end of the outer tube and inserted into the inner tube. The rod extends through the connection part and is fixed to the lower end of the pneumatic cylinder. The inner tube is movable along the rod by the movement of the connection part in the inner tube.

The primary object of the present invention is to provide a front suspension fork which uses a pneumatic cylinder and a movable member is adjusted to move up and down to adjust the travel of the pneumatic cylinder and the inner tube.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2-1 shows a cross sectional view to show the adjustable device of the front suspension fork of the present invention;

FIG. 2-2 shows a cross sectional view to show that the movable member is movably extends through the connection tube;

FIG. 2-3 shows a cross sectional view to show that the rod is connected to the lower end of the pneumatic cylinder;

FIG. 3 is a cross sectional view to show the positions of the inner tube of the leg after being adjusted, and FIG. 4 a cross sectional view to show the conventional front suspension fork.

DETAILED DESCRIPTION OF THE PREFERRED EMBODIMENT

Figure 1:
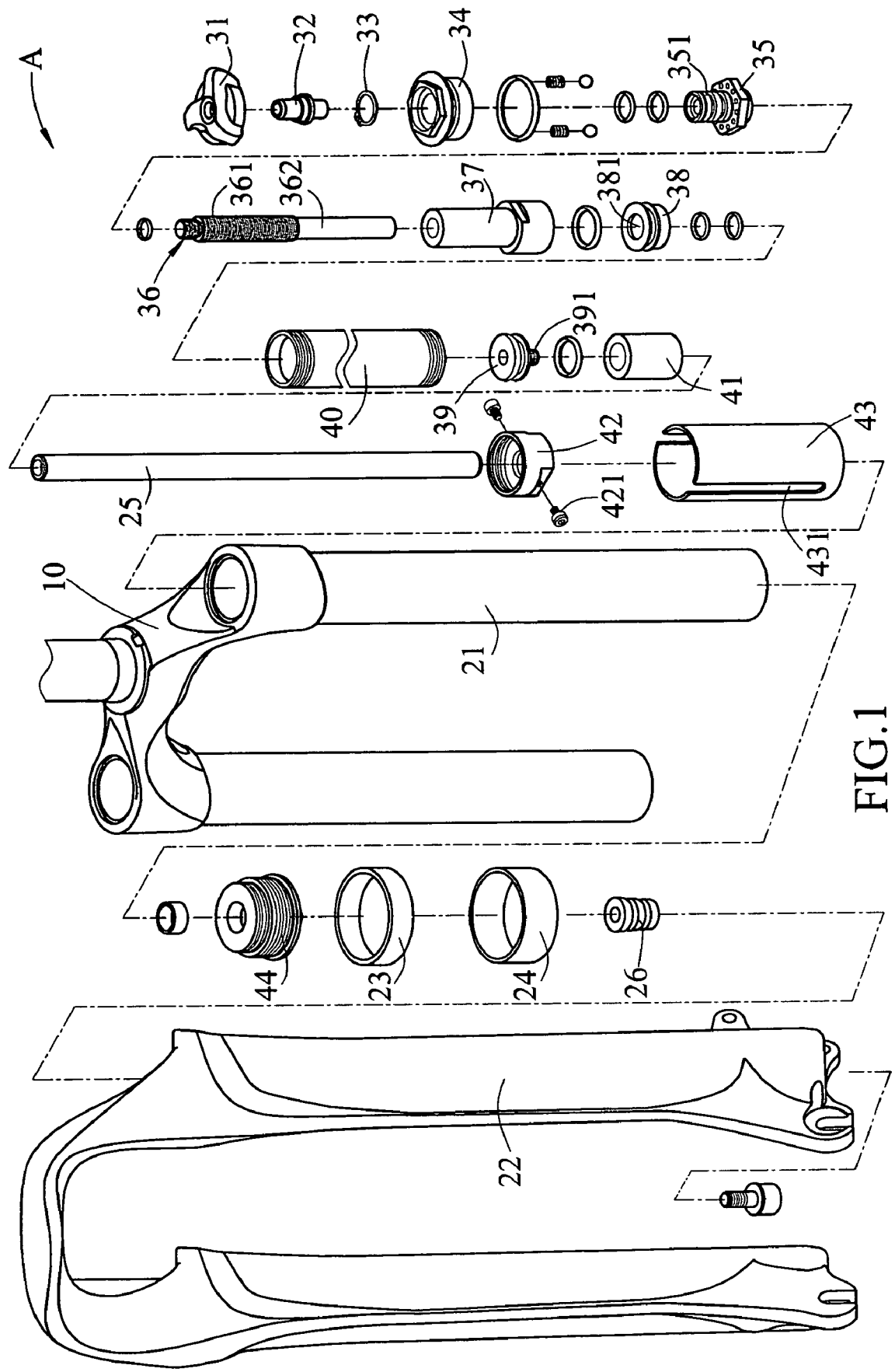
FIG. 1 is an exploded view to show the front suspension fork of the present invention.
Figure 2:
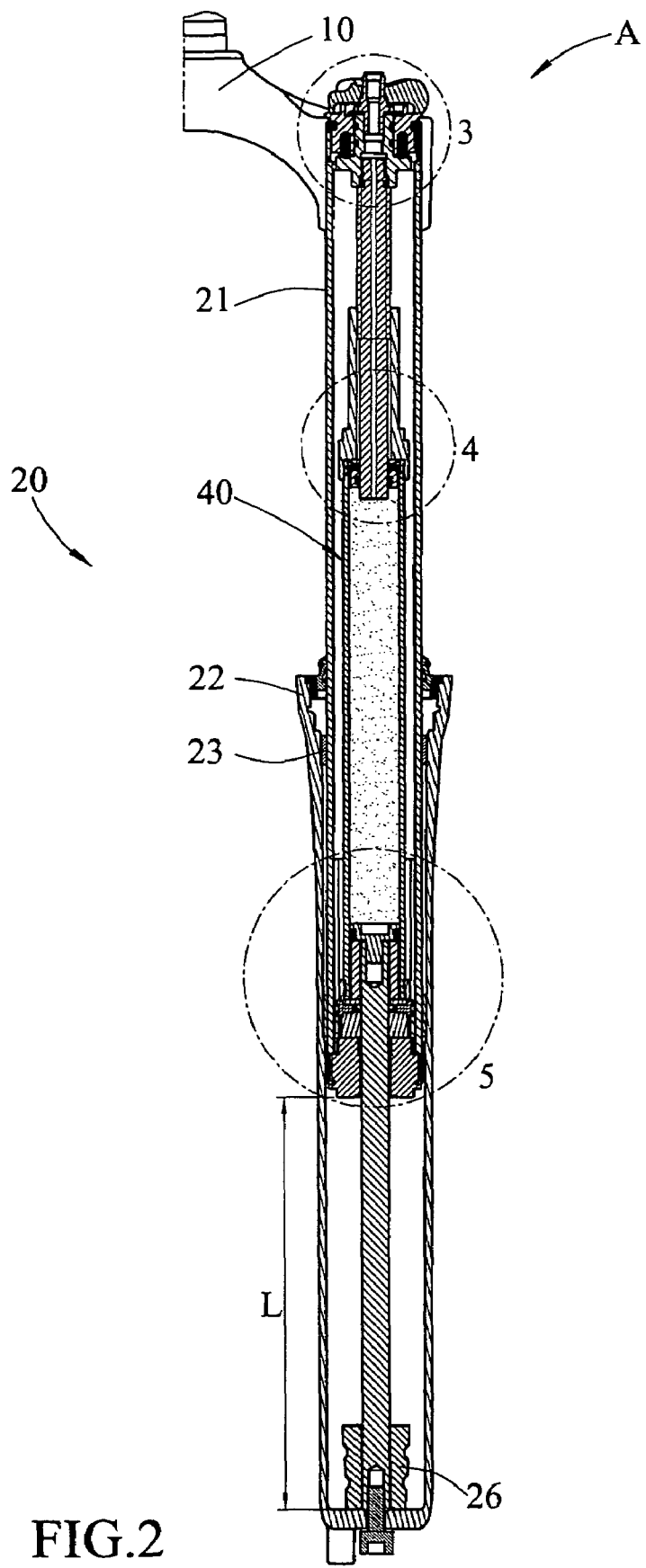
FIG. 2 is a cross sectional view to show the front suspension fork of the present invention.
Figures 1, 2:
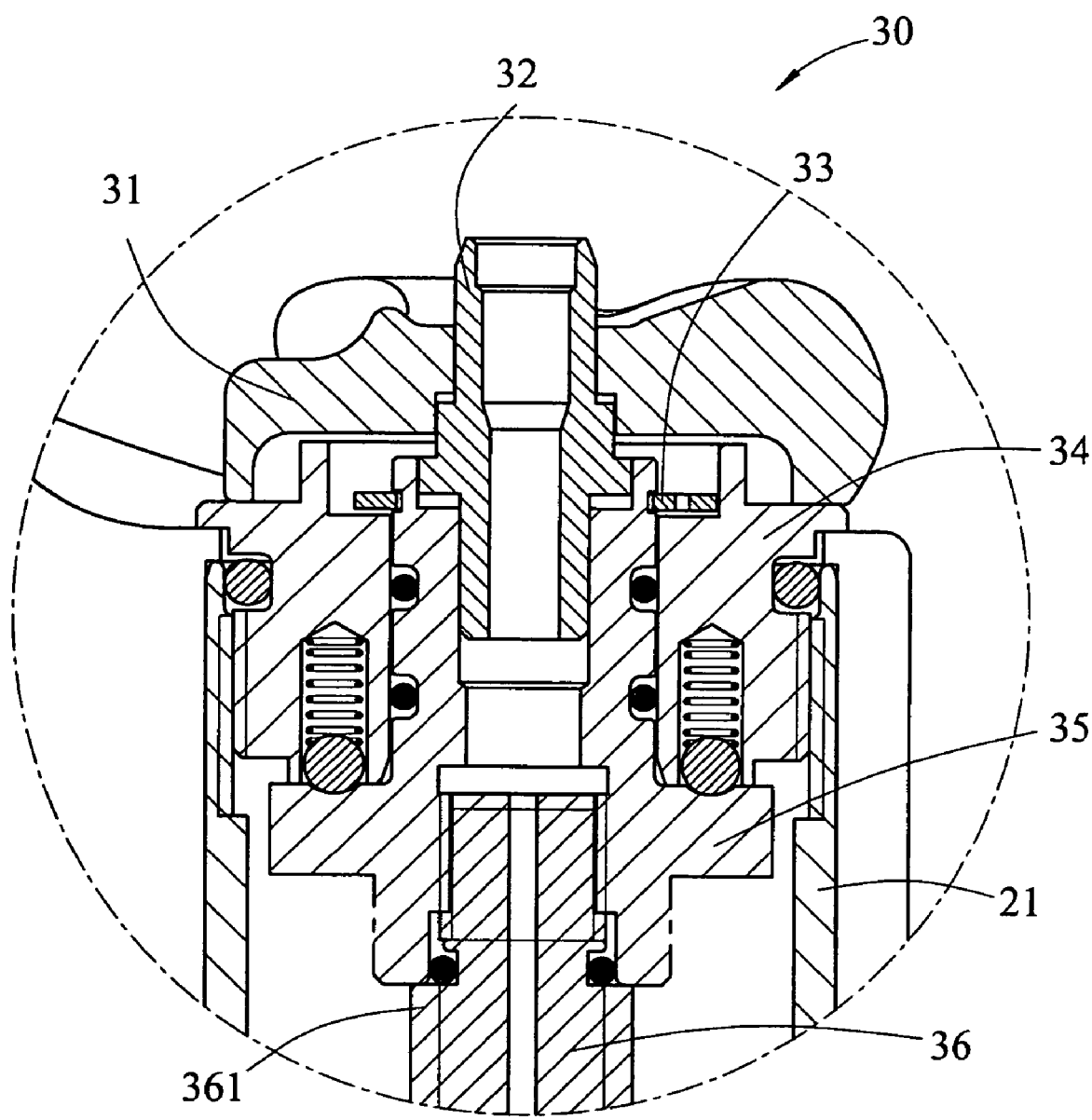
Figure 2:
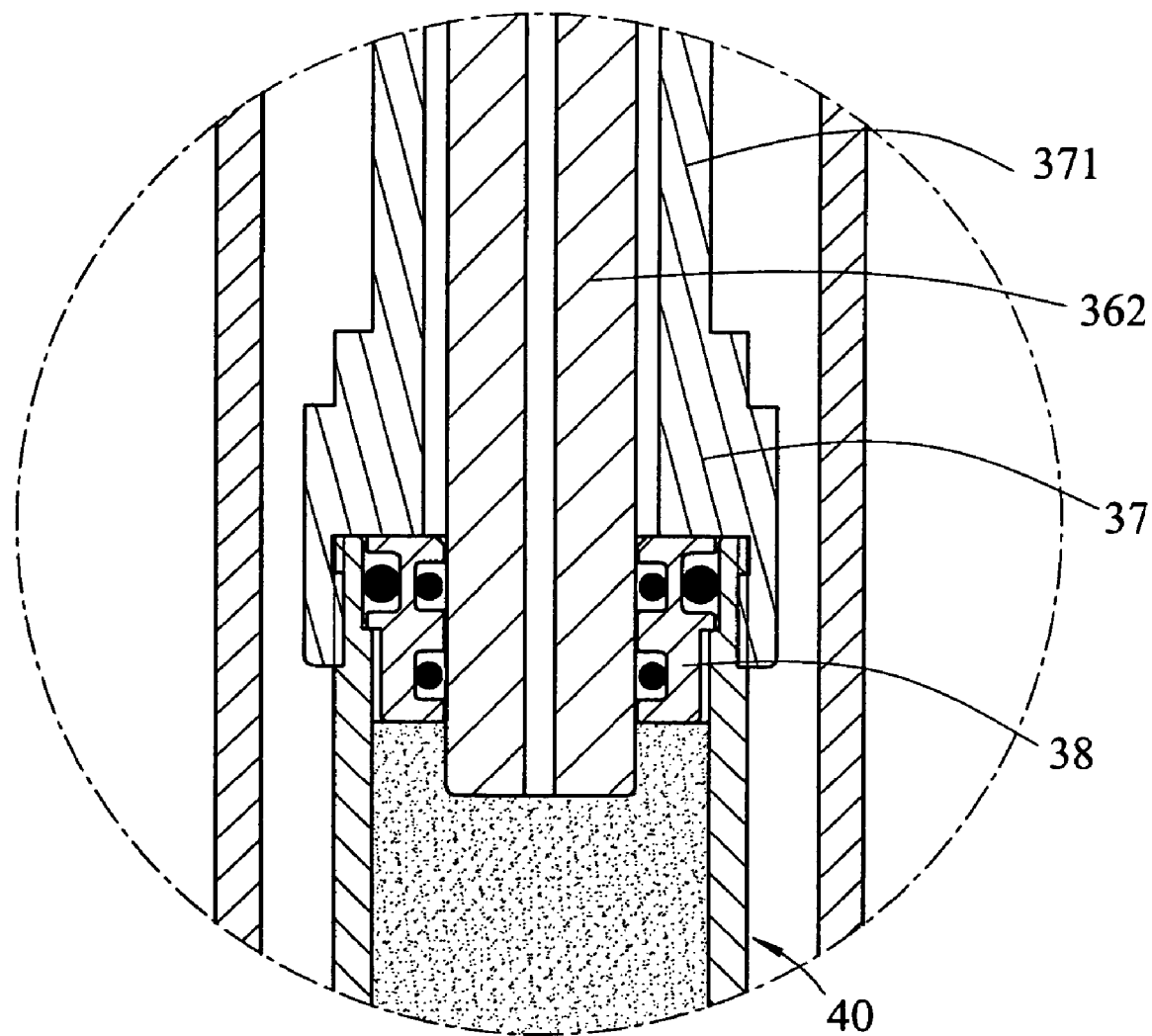
Figures 2, 3:
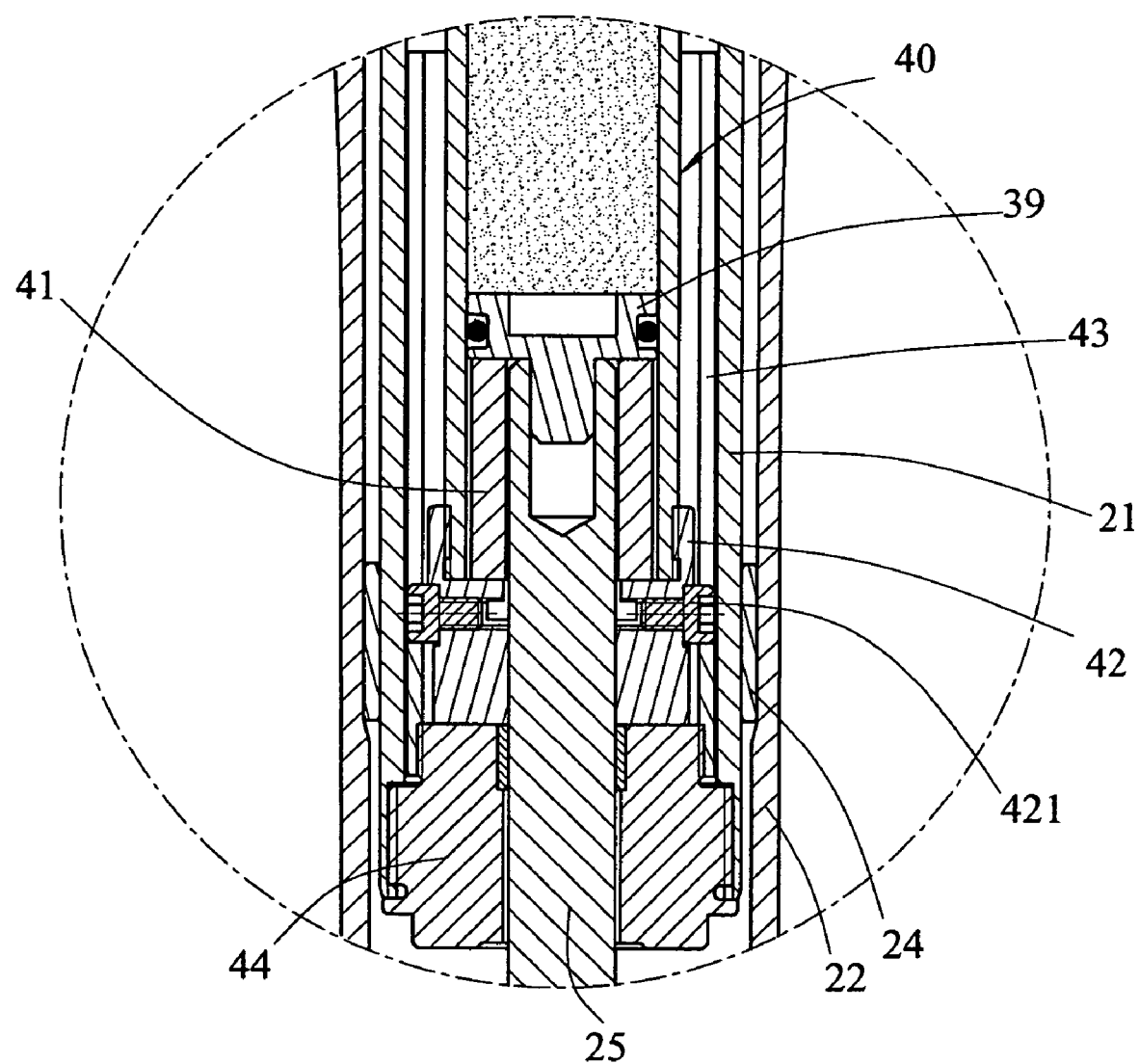
Figure 3:
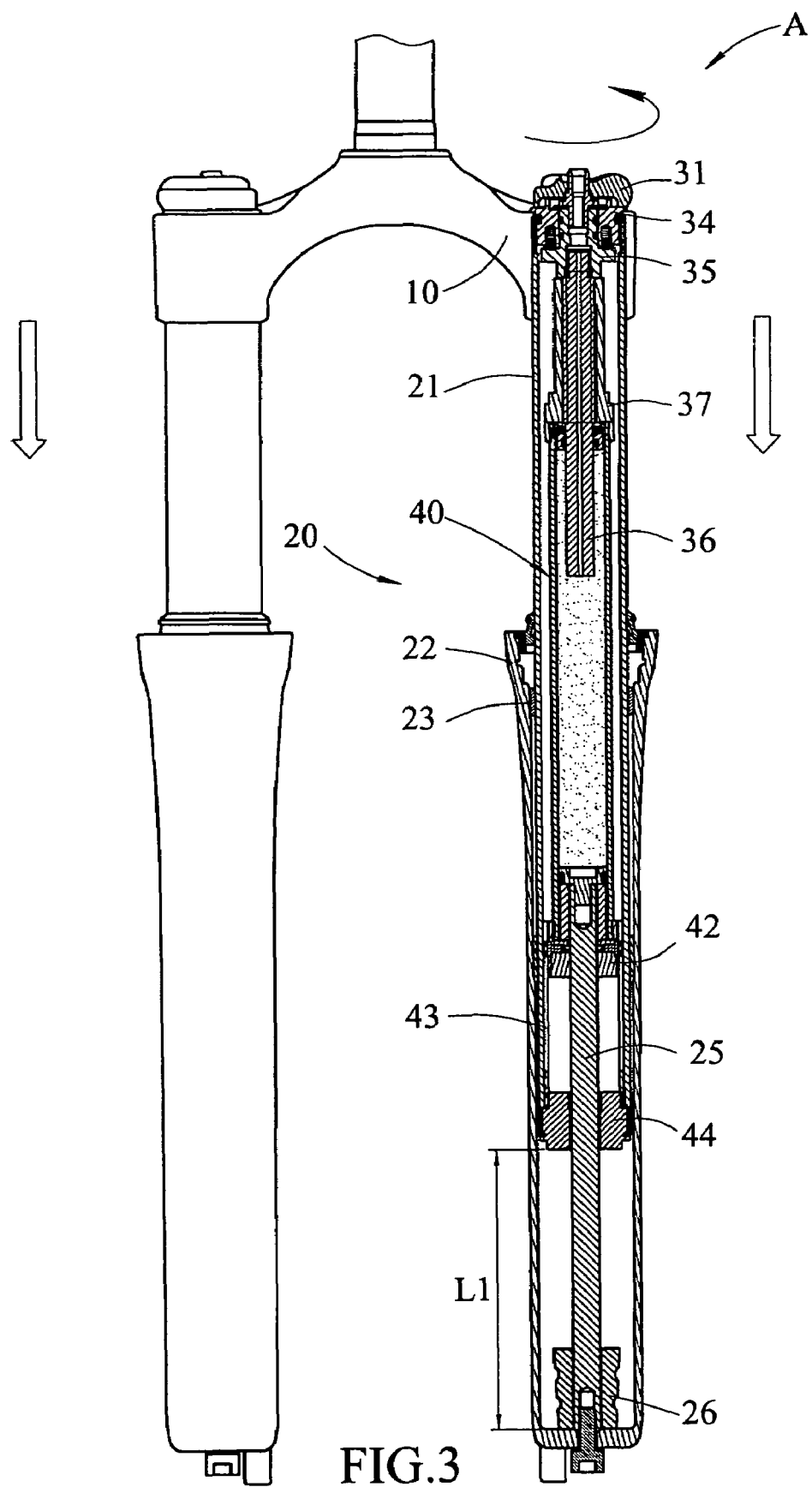
Figure 4:
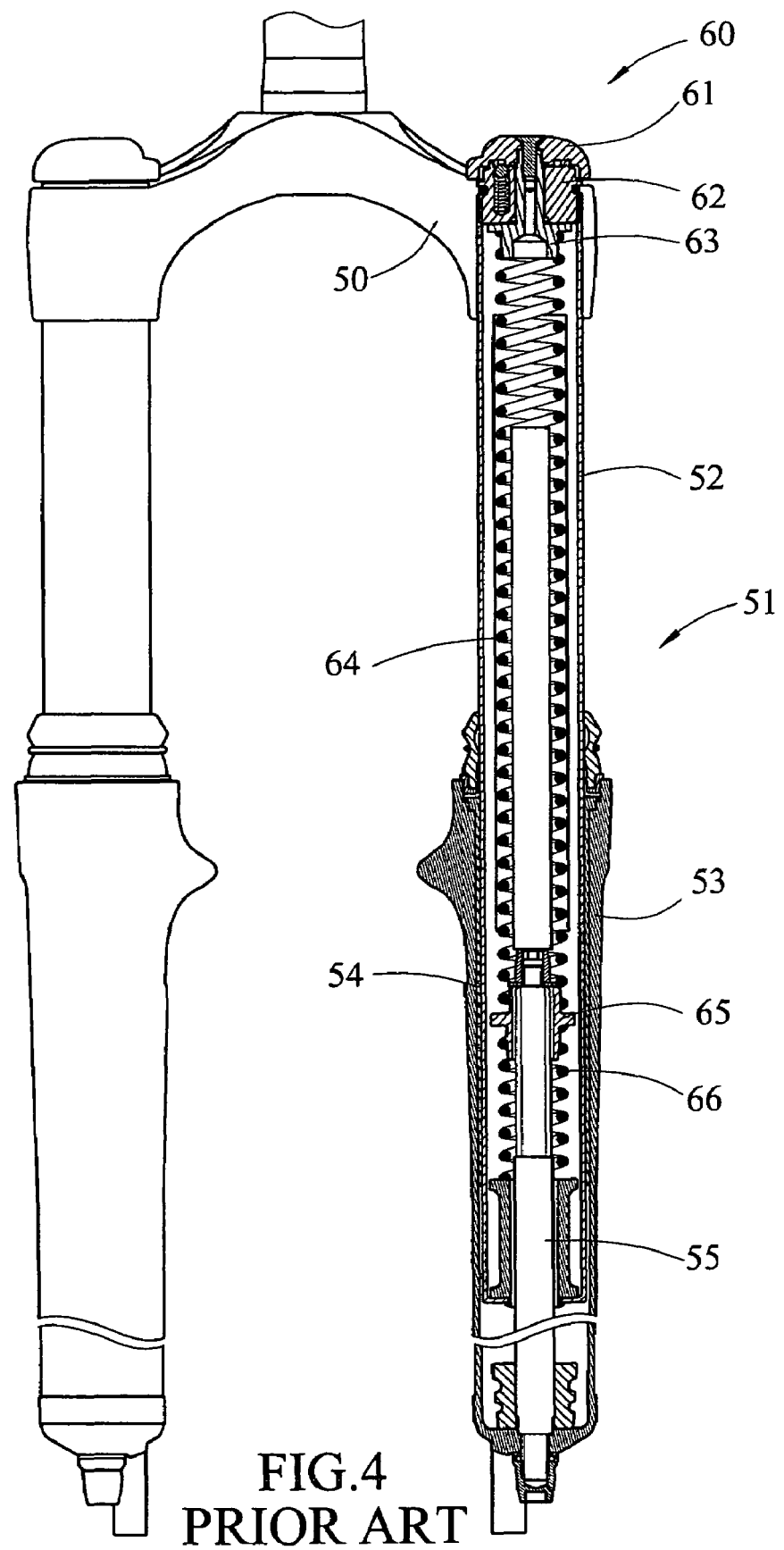

Referring to FIGS. 1, 2, 2-1, 2-2 and 2-3, the front suspension fork "A" of the present invention comprises a crown 10 with two legs 20 connected thereto and each leg 20 having an outer tube 22 and an inner tube 21 which is movably inserted into the outer tube 22. An upper bush 23 and a lower bush 24 are located between the inner tube 21 and the outer tube 22. A top of each of the inner tubes 21 is connected to the crown 10.

An adjustable device 30 is connected to at least one of the two inner tubes 21 and includes a rotatable cap 31, a connection member 34 connected to the inner tube 21 and a rotatable member 35. A movable member such as a threaded rod 36 in this embodiment is connected to a lower end of the rotatable member 35 and is co-rotated with the rotatable member 35. The threaded rod 36 has a thread 361 defined in an upper section thereof and a cylindrical portion 362 on a lower section of the threaded rod 36. The threaded rod 36 is threadedly connected to an inner threaded periphery of a tubular portion 371 of a connection tube 37 so that the threaded rod 36 is rotatably moved relative to the connection tube 37. The connection member 34 has a hole through which a tubular portion of the rotatable member 35 extends and is positioned by a C-clip 33. The rotatable member 35 has a valve 32 connected thereto and the valve 32 extends through the cap 31.

A pneumatic cylinder 40 has a pre-set pressure and is connected to the movable member 36 by a connection tube 37. A top collar 38 is connected to a top of the pneumatic cylinder 40 and includes a hole though which the movable member 36 movably extends. The pneumatic cylinder 40 can be moved up and down by rotation of the movable member 36. A connection part 42 is pivotably connected to a lower end of the pneumatic cylinder 40 and an outer periphery of the connection part 42 is movably connected to the inner tube 21. A rod 25 is connected to a lower end of the outer tube 22 and inserted into the inner tube 21. The rod 25 extends through the connection part 42 and is retained therein 40. The rod 25 extends into the lower end of the pneumatic cylinder 40 and a sleeve 41 is mounted to a top of the rod 25 and a bottom collar 39 is mounted on a top of the sleeve 41. The bottom collar 39 has a threaded section 391 which is fixed to the top of the rod 25. The inner tube 21 is movable along the rod 25 by the movement of the connection part 42 in the inner tube 21.

A connection part 42 is threadedly connected to the lower end of the pneumatic cylinder 40 and two bolts 421 extend radially into the connection part 42. A slip tube 43 is located between the inner tube 21 and the pneumatic cylinder 40. The slip tube 43 includes two slots 431 within which the two bolts 421 movably extend.

Referring to FIG. 3, when rotating the cap 31 to rotate the threaded rod 36, the pneumatic cylinder 40 is driven to move upward. The outer tube 22 is connected to the wheel hub so that the outer tube 22 is fixed and the two bolts 421 moves upward in the slots 431. The travel of the inner tube 21 is changed from the original travel "L" which is measured from the lower end of the inner tube 21 to the shock absorbing member 26 in the outer tube 22, to the adjusted travel "L1" which is shorter than the "L". The pressure of the pneumatic cylinder 40 is fixed so that when the pneumatic cylinder 40 is compressed, the air in the pneumatic cylinder is compressed and generates a bounce force when the force applied to the pneumatic cylinder 40 is released. Therefore, the travel of the inner tube 21 can be adjusted by the above mentioned steps.

The pressure in the pneumatic cylinder 40 can be adjusted by introducing air into the valve 32 so as to set a desired pre-pressure in the pneumatic cylinder 40. According to the formula F(force)=P(pressure) X A(area), the area for adjusting the travel is smaller and the pressure in the pneumatic cylinder 40 is fixed so that the force is smaller than the conventional adjustable front suspension fork. Because the rider contributes a part of the load of the front suspension fork so that when the vibration or shocks coming from the road is transferred to the front suspension fork, the reaction of the front suspension fork happens in a shorter distance so that the reaction is more sensitive than the conventional. The pneumatic cylinder 40 or other parts can be replaced easily and no heavy springs are used so that the front suspension fork of the present invention is light in weight.

While we have shown and described the embodiment in accordance with the present invention, it should be clear to those skilled in the art that further embodiments may be made without departing from the scope of the present invention.

What is claimed is:

1. A front suspension fork comprising:
   a crown with two legs connected thereto and each leg having an outer tube and an inner tube which is movably inserted into the outer tube, a top of the inner tube connected to the crown;
   an adjustable device connected to at least one of the two inner tubes and having a rotatable cap, a connection member connected to the inner tube and a rotatable member;
   a movable member connected to a lower end of the rotatable member and being co-rotated with the rotatable member;
   a pneumatic cylinder having a pre-set pressure and connected to the movable member by a connection tube, the pneumatic cylinder moved up and down by rotation of the movable member;
   a connection part pivotably connected to a lower end of the pneumatic cylinder and an outer periphery of the connection part movably connected to the inner tube, whereby the inner tube is movable relative to the connection part and pneumatic cylinder; and
   a rod connected to a lower end of the outer tube and inserted into the inner tube, the rod extending through the connection part, the inner tube movable along the rod by the movement of the connection part in the inner tube.

2. The fork as claimed in claim 1, wherein the adjustable device includes a connection member which has a hole through which a tubular portion of the rotatable member extends and is positioned by a C-clip.

3. The fork as claimed in claim 1, wherein the rotatable member has a valve connected thereto and the valve extends through the cap.

4. The fork as claimed in claim 1, wherein the movable member is a threaded rod.

5. The fork as claimed in claim 4, wherein the threaded rod has a thread defined in an upper section thereof and a cylindrical portion on a lower section of the threaded rod.

6. The fork as claimed in claim 4, wherein the threaded rod threadedly connected to an inner threaded periphery of a tubular portion of a connection tube so that the threaded rod is rotatably moved relative to the connection tube.

7. The fork as claimed in claim 1, wherein a top collar is connected to a top of the pneumatic cylinder and includes a hole though which the movable member movably extends.

8. The fork as claimed in claim 1, wherein the rod extends into the lower end of the pneumatic cylinder, a sleeve is mounted to a top of the rod and a bottom collar is mounted on a top of the sleeve, the bottom collar has a threaded section which is fixed to the top of the rod.

9. The fork as claimed in claim 1, wherein a connection part is threadedly connected to the lower end of the pneumatic cylinder and two bolts extend radially into the connection part, a slip tube is located between the inner tube and the pneumatic cylinder, the slip tube includes two slots within which the two bolts movably extend.

* * * * *